United States Patent [19]

Hyanova et al.

[11] 4,028,943
[45] June 14, 1977

[54] PRESSURE AND TEMPERATURE SENSING DEVICE

[76] Inventors: Blanka Hyanova, No. 1 Sazavska; Vladimir Plasil, No. 25 Narodni, both of Prague, Czechoslovakia

[22] Filed: July 28, 1975

[21] Appl. No.: 599,532

[30] Foreign Application Priority Data

July 30, 1974 Czechoslovakia ............... 5420/74

[52] U.S. Cl. ................................ 73/345; 73/393
[51] Int. Cl.² ................................ G01K 1/26
[58] Field of Search ...... 73/345, 389, 393, 398 AR; 338/3, 4

[56] References Cited

UNITED STATES PATENTS

| | | |
|---|---|---|
| 2,344,648 | 3/1944 | Simmons ........................ 338/3 |
| 2,421,907 | 6/1947 | Postlewaite ..................... 338/4 |
| 2,663,781 | 12/1953 | Rundell ........................ 338/4 X |
| 2,883,503 | 4/1959 | Osgood ........................... 338/4 |
| 3,242,448 | 3/1966 | Paine et al. ................. 73/393 X |
| 3,505,862 | 4/1970 | List et al. .................. 73/389 X |
| 3,745,835 | 7/1973 | Smith .......................... 73/345 |

*Primary Examiner*—Jerry W. Myracle

[57] ABSTRACT

Device for sensing pressure and temperature for making measurements at elevated temperatures without the application of special cooling means. The device comprising a measuring tube with a tensometric winding, and a protecting tube inside this measuring tube provided with a resistance winding for measuring temperatures.

3 Claims, 3 Drawing Figures

PRESSURE AND TEMPERATURE SENSING DEVICE

BACKGROUND OF THE INVENTION

The invention relates to a sensing or pick-up device for detecting pressure and temperature comprising a measuring tube and a holder of a temperature feeler.

A rather frequent task in the diagnostic determination of technical conditions of different machines, for instance of combustion engines, compressors and the like, is the determination of pressures and temperatures in the working space. Pressure pick-up devices are used for this purposed based on known piezoelectric, capacitative or tensometric principles and resistance feelers or thermoelements for picking up temperatures. If the measurements take place in a medium with a temperature above 100° C, additional auxiliary cooling by a cooling medium such as water, pressure air, and the like is required for reliable, continuous operation of the pick-up device.

This usually used arrangement has a number of drawbacks from the point of view of operation. It is above all difficult under conditions of operation tests (for instance on locomotives, on tractors and the like) to employ a suitable cooling medium. The necessity to use cooling means leads to an increase of the dimensions of the device, so that it becomes impossible for most machines to situate the pick-up device as close as possible to the measured space, for instance in the cylinder of an engine. The picking-up of pressure has to be accomplished through an extending piece or fitting, which distorts the thus measured pressures. The securing and distributing of the cooling medium while simultaneous measuring pressures at a plurality of cylinders substantially complicates both the overall arrangement of the diagnostic apparatus, and also the checking of the operation of the cooling system, and thus increases the danger of failure of the device. For instance, a failure of the supply of the cooling medium in internal combustion engines causes a quick destruction of the device or sensing feeler; which is a costly part of the diagnostic arrangement.

The determination of one diagnostic value, of pressure, however, is generally not sufficient for the determination of the technical condition of a machine. It is therefore necessary to complete this reading by the determination of a further diagnostic value, the operating temperature. In case of application of customary feelers, the whole diagnostic arrangement becomes rather complicated, particularly in case of simultaneous measurements on a plurality of cylinders. For instance, for measurements on cylinders of a twelve cylinder internal combustion engine we have to provide and check the correct functioning of 24 pick-up devices (feelers) and of 12 supplies of a cooling medium, in all a total of 36 check points. Under these conditions the reliability of the measuring system frequently is lower overall than the reliability of the machine being checked.

SUMMARY OF THE INVENTION

It is an object of this invention to provide an arrangement which at least to a large degree eliminates these drawbacks and which allows measurements to be made continuously at elevated temperatures and without special cooling means.

The combined sensing or pick-up device according to this invention uses a measuring tube for the indirect determination of pressure, such pressure causing variations of the measuring diameter and thus also variations of the length of a tensometric wire of an active winding situated on this measuring tube. Variations of temperature of this active winding are compensated by a tensometric compensation winding situated on the body of a protecting tube for making measurements of temperatures. The temperature sensor is disposed in this protecting tube, which forms an integral part of the pressure pick-up device.

This combined tensometric pressure pick-up device with a temperature feeler operates without any auxiliary cooling, since the tensometric wire used has the same coefficient of thermal expansion as the material of the measuring tube, and a very small change of resistivity upon change of temperature, which change is additionally compensated by the said tensometric compensation winding. This arrangement therefore enables the combined pick-up device to be exposed for longer periods of operation to high temperatures, for instance up to 600° C, without its destruction or change of its sensivity. In addition, the compensating winding eliminates the influence of usually occurring electric and electromagnetic disturbing fields.

Due to this constructional arrangement, the combined pressure pick-up device with a temperature feeler according to this invention has the following advantages over generally used pick-up devices:

1. Substantially smaller dimensions of the pick-up device and thus the possibility of its situating on any measuring place.
2. The possibility of picking-up simultaneously the pressure and temperature of a large number of processes under operating conditions.
3. Independence from a cooling medium.
4. An advantageous linear dependence between the measured pressure and the corresponding electrical signal.
5. The possibility of using any temperature feeler.
6. A substantial decrease or suppresion of the influence of temperature on distortion of the picked-up pressure measurements.
7. Elimination of long indication channels and of their unfavorable influence on the actual course of measured pressures.
8. Substantially lower manufacturing costs.
9. Easier assembling and reduction of the number of pick-up devices on the investigated machine.

DESCRIPTION OF DRAWING

An exemplary embodiment of a pick-up device according to this invention is shown on the attached drawing, wherein.

DESCRIPTION OF PREFERRED EMBODIMENT

Figure 2:
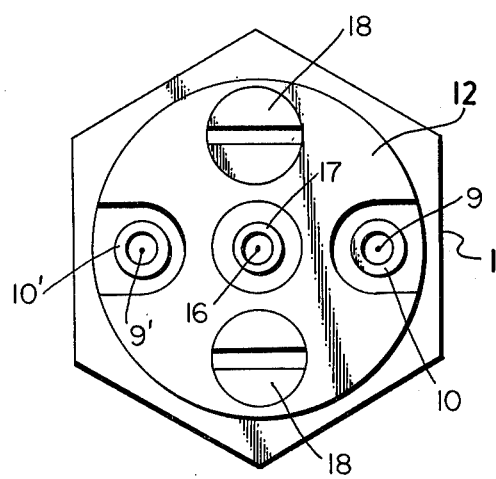

In the illustrative preferred embodiment the sensor or pick-up device has a massive case 1 which is hexagonal in horizontal transverse section and at the bottom thereof has a neck in circular cylindrical portion having an external thread 28 thereon by which it is vertically mounted in a suitable opening in the wall of the apparatus, such as the cylinder of an internal combustion engine, which is being checked or diagnosed. Mounted coaxially within the case 1 is a composite tube 2', 7 which is connected to the neck in lower portion of the case 1 as shown and is accurately retained in position at its upper end by a flange 12 which is disposed within a counter bore at the upper end of the case and is secured thereto by machine screws 18, as shown in FIG. 2. Additionally, the measuring tube 2 is sealed to the lower end of the case 1 by an annular weld 23 at its lower end. Above the threaded connection between the lower end of the measuring tube 2 and the lower end of the case 1, on a portion of reduced diameter of the measuring tube 2 the measuring tube is provided with an electrically insulating high temperature resistant coating 19' made for example of a mica varnish or a glass melt. Wound upon the layer 19' with a predetermined prestress is an active tensometric (e.g., strain gauge) wire winding 3. The lower end of winding 3 is welded to the measuring tube 2 at 24, as shown.

A protecting tube 7 is disposed within the case 1 coaxial of the measuring tube 2 therein, the tube 7 having a lower end of reduced diameter which is telescoped within the measuring tube 2. The lower end portion of the protecting tube 7, extending from the lower end thereof to a point at least at the level of the upper end of the tensometric winding 3, is spaced radially inwardly from the confronting inner surface of the measuring tube 2 so as to present an annular gap 26 therebetween. The upper end portion of such annular gap 26 underlies the thin walled part of the measuring tube 2 upon which the tensometric winding 3 is disposed, differences in pressure within the apparatus being checked being transmitted to the inner surface of the thin walled portion of measuring tube 2 which thereupon changes in diameter with the changes in the pressure to which it is subjected. Such changes in diameter of the thin walled portion of measuring tube 2 subjects the tensometric winding 3 to varying tensions, thereby changing its effective length and thus its resistance.

Figure 3:
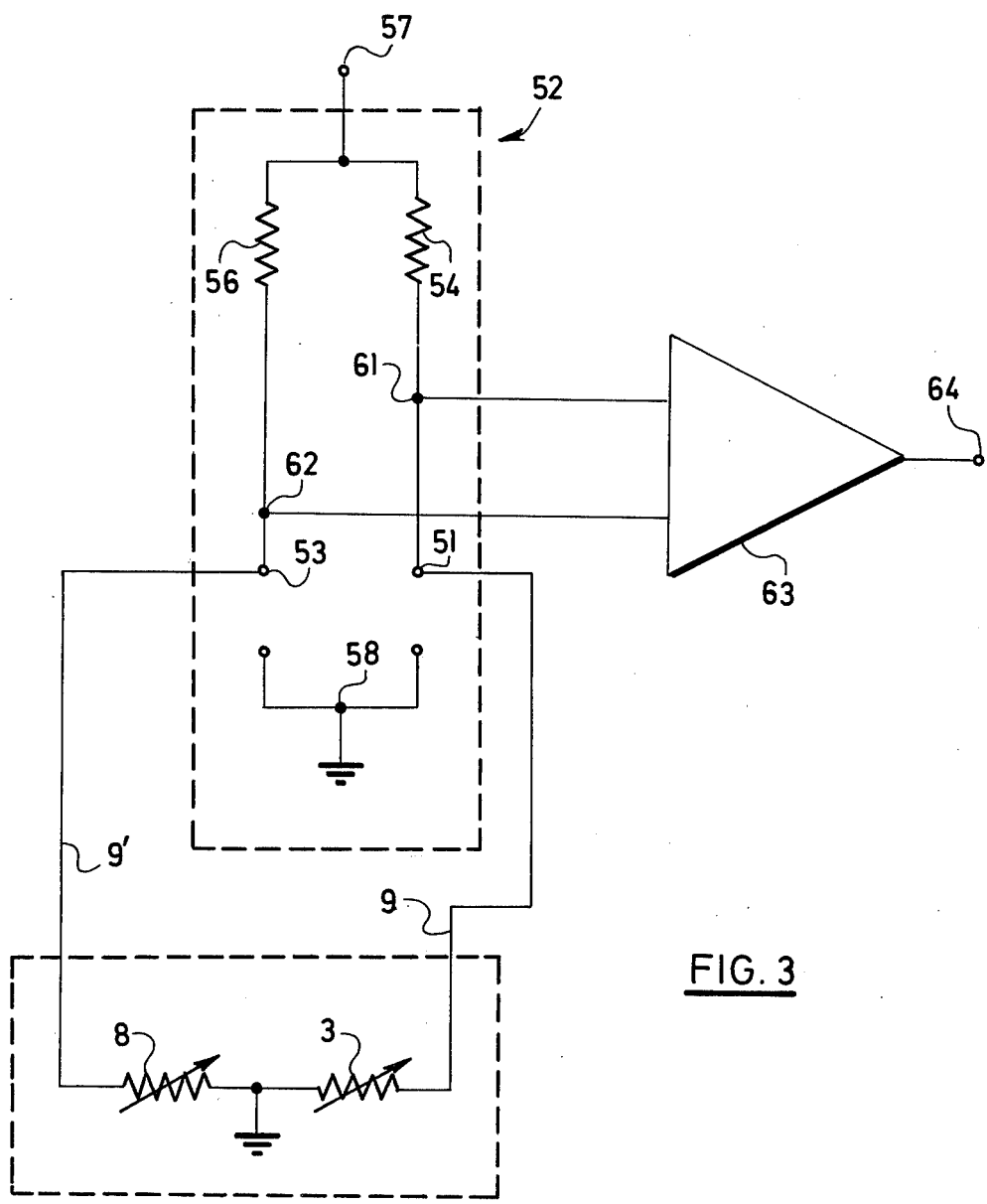
FIG. 3 is a schematic diagram of a tensometric bridge arrangement connectable to the pick-up device of FIG. 1 for generating a signal proportional to pressure-induced changes in the resistance of the pick-up device.

Above its lower, thin walled portion the protecting tube 7 has an enlarged axially extending shoulder which accurately fits within the upper end of the measuring tube 2. As shown, the upper end of the measuring tube 2 is sealed and secured to the protecting tube 7 by an annular weld 20. In an upper portion thereof the protecting tube 7 has an elongated circular cylindrical portion with an outer diameter which is the same as that of the portion of measuring tube 2 upon which the tensometric winding 3 is positioned. Disposed upon such circular cylindrical portion of protecting tube 7 there is an insulating layer 19 made for example of mica varnish or a glass melt upon which there is disposed a tensometric compensation winding 8 having the same length and dimensions as winding 3. The above-mentioned annular weld 20 between the tubes 2 and 7 is disposed between similar outwardly flanged portions at the upper end of the measuring tube 2 and an intermediate portion of the protecting tube 7 disposed immediately thereabove. Overlying such welded together outwardly flanged portions of tubes 2 and 7 is an annular insulating layer 6 made for example of a glass melt. Telescoped over and supported by the lower portion of the insulating layer 6 is a lower electrically conducting ring 4 which is connected as shown to the upper end of the tensometric winding 3. Supported on the upper portion of the insulating layer 6 and separated from the lower ring 4 is an upper ring 5 which is connected as shown to the lower end of the tensometric compensation winding 8. A heat proof cable 9 extends from the lower ring 4 upwardly through an electrically insulating tube 10 to a first measuring arm 51 (FIG. 3) of a tensometric bridge 52. A similar heat proof cable 9' extends from the upper ring 5 through an electrically insulating tube 10' to a second measuring arm 53 of the bridge 52. The upper end of the tensometric compensation winding 8 is connected to the tube 7 by a weld 22. It will thus be seen that the windings 3 and 8 are connected at one end thereof to each other and to a common ground, that is, the metal body of the apparatus being tested by way of the case 1 and the tubes 2 and 7.

Coaxially disposed within the protecting tube 7 there is a tube-like holder 11 having radially outwardly extending flange portions at its upper, intermediate and lower ends, such flange portions accurately locating the holder 11 with respect to the tube 7. The flange 12 engages the upper end portion of the holder 11 and thus holds its securely in place with respect to the case 1 and the protecting tube 7. Affixed to the lower end of the holder 11 through the medium of an electrically insulating annular layer 14 is a metal extension 13. Wound upon the lower end of the holder 11 between the lower and intermediate radially outwardly extending flanges thereon is a temperature detecting resistance winding 15, the upper end of which is welded to the holder 11. The lower end of winding 15 is connected by a heat proof electrically insulated cable 21 to the extension 15. A heat proof cable 16 which extends vertically axially within the holder 11 is welded at its lower end at 25 to the lower end of the extension 15. It will thus be seen that the temperature sensing winding 15 is connected to ground at its upper end and to the cable 16, which extends upwardly and outwardly through tube 17 which forms a part of the holder 11 to a suitable temperature sensing bridge (not shown). As shown, the winding 15 is disposed upon a heat resistant electrically insulating layer similar to the insulating layers 19 and 19' upon which windings 3 and 8 are disposed. The temperature measuring resistant winding 15 is protected from contact with the atmosphere existing within the apparatus being tested by reason of the fact that the holder 11 is disposed within the composite tube 2,7, and that the lower end of protecting tube 7 is closed by an imperforated lower end 27.

Figure 1:
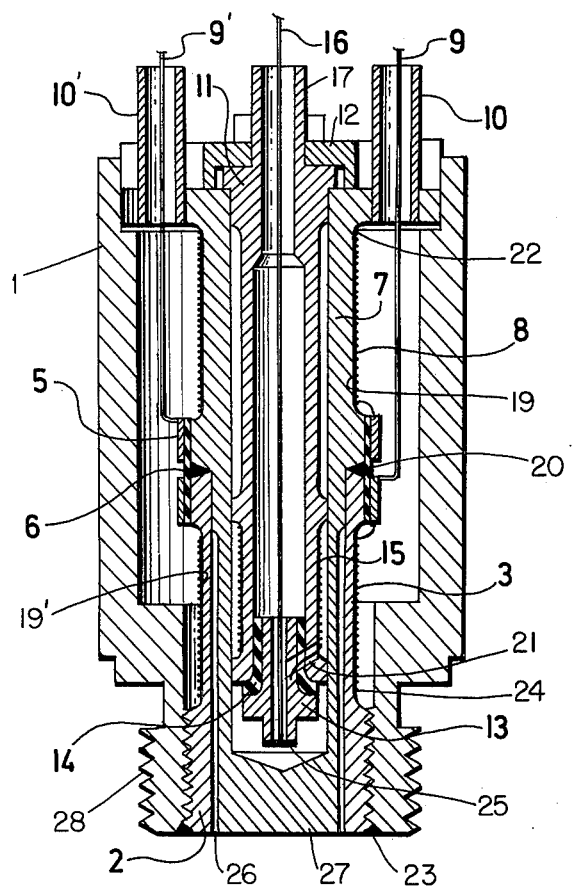
FIG. 1 is a sectional view of a pick-up device, the plane of section passing through the vertical axis of the pick-up device, FIG. 2 a top view of the pick-up device.

The bridge 52 (FIG. 3) is further provided with a pair of balancing arms 54, 56 which are individually associated in a conventional manner with the measuring terminals 51 and 52. A suitable DC source (not shown) is coupled between an excitation terminal 57 and a grounded terminal 58 of the bridge. A pair of output terminals 61 and 62, which are respectively disposed at the junctions of the elements 54, 51 and 56, 53 of the bridge, are connected to the inputs of a differential amplifier 63. The output of the amplifier 63, represented by a terminal 64, exhibits a signal proportional to the changes in pressure picked up by the device of FIGS. 1 and 2.

The tensometric compensation winding 8 serves to suppress errors due to changes of temperature in the pick-up device. In order to suppress induced disturbances due to alternating electrically or electromagnetic fields and due to different potentials when the sensing or pick-up device is connected to frames of large pieces of apparatus being tested, the active tensometric winding 3 and the tensometric compensation winding 8 have identical geometric shapes, a common ground connection, as above noted, and relative directions of winding such that disturbances in voltages therein do not appear at the output of the tensometric measuring bridge 52. In the assumed case where the pick-up or sensor of the invention is employed within the differential amplifier 63, the windings 3 and 8 are wound in the same direction.

The pick-up or sensor device according to the invention operates as follows:

A change of the measured pressure, for instance in the cylinder of an internal combustion engine, causes a change that is, an increase or decrease in the diameter of the measuring tube 2 in the portion thereof underlying the tensometric winding 3. The length of the active tensometric winding 3 is thereby also changed, and thus its resistance is also changed. This change of resistance of winding 3 causes a corresponding change of voltage in the tensometric measuring bridge 52 to which the pick-up or sensor of the invention is connected. Such voltage difference is amplified by the differential amplifier 63, and the voltage at the output 64 of the amplifier 63 is directly proportional to the measured voltage.

Pick-up devices or sensors according to the present invention can be utilized not only as parts of diagnostic measuring apparatus, but also as permanent, easily calibrated, parts of large machines, thereby permitting simultaneous, current observations of important operating values, such as, pressure and temperature. The pick-up devices according to the invention can also be employed with systems which safeguard the operation of the apparatus with which they are employed as by signaling operating personnel when certain predetermined values of operating parameters are exceeded. Pick-up devices according to the invention can also be a part of the test room equipment of both manufacturers and consumers of various types of machines.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. In a device for simultaneously sensing pressure and temperature of a test apparatus, an elongated case having a lower end, means for connecting the lower end of the case to the test apparatus, a measuring tube extending downwardly within the case, the measuring tube having a lower portion in contact with the lower end of the case and terminating flush with the lower end of the case, the measuring tube having a central portion disposed above the lower portion thereof and spaced from the case, and active strain gauge winding disposed on the central portion of the measuring tube, a protecting tube extending downwardly within the case and having a lower portion disposed within and spaced from the lower portion of the measuring tube, the lower end of the protecting tube terminating in alignment with the lower end of the measuring tube to define, between the lower portions of the measuring tube and the protecting tube, a gap providing open and unobstructed communication between the interior of the test apparatus and the central portion of the measuring tube, a compensating strain gauge winding disposed on an upper portion of the protecting tube, and sensing means disposed inside and in contact with the protecting tube for detecting the temperature of the test apparatus when the lower end of the case is connected thereto.

2. A device as defined in claim 1, wherein the compensating winding has a direction of winding which is the same as that of the active winding.

3. A device as defined in claim 1, in which the upper portion of the protecting tube overlies the central portion of the measuring tube within the case.

* * * * *